(12) United States Patent
Banks

(10) Patent No.: US 6,263,001 B1
(45) Date of Patent: Jul. 17, 2001

(54) PACKET DATA COMMUNICATION PROTOCOL WITH REDUCED ACKNOWLEDGEMENTS IN A CLIENT/SERVER COMPUTING SYSTEM

(75) Inventor: Andrew David James Banks, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/010,374

(22) Filed: Jan. 21, 1998

(30) Foreign Application Priority Data

Aug. 2, 1997 (GB) .................................................. 9716307

(51) Int. Cl.[7] ...................................................... H04L 1/00
(52) U.S. Cl. ............................................ 370/522; 714/748
(58) Field of Search .................................. 370/522, 389, 370/245; 709/203; 714/748

(56) References Cited

U.S. PATENT DOCUMENTS 5,745,685 * 4/1998 Kirchner et al. ................ 395/200.14

FOREIGN PATENT DOCUMENTS 0 324 886    7/1989  (EP) .

* cited by examiner

*Primary Examiner*—Melvin Marcelo
(74) *Attorney, Agent, or Firm*—Edward H. Duffield

(57) ABSTRACT

A method of communicating packet based digital data over a communications network between a sender and a receiver, includes steps of sending a request, the request having a plurality of packets, to a receiver; receiving an acknowledgement from the receiver for each packet of the request; receiving a reply from the receiver, the reply having a plurality of packets, at least one of the packets including an indication that the packet need not be acknowledged upon receipt; and acknowledging only the packets of the reply that do not contain the indication.

11 Claims, 1 Drawing Sheet

PACKET DATA COMMUNICATION PROTOCOL WITH REDUCED ACKNOWLEDGEMENTS IN A CLIENT/ SERVER COMPUTING SYSTEM

FIELD OF THE INVENTION

The present invention relates to protocols (i.e., sets of rules) for the communication of digital data between a sender and receiver (e.g., the sender and receiver are computer systems located at different physical locations).

BACKGROUND OF THE INVENTION

The usual form of digital data communication involves sending such digital data over a packet-based network. A packet is a group of bits representing a portion of the digital data and each packet is treated individually by the network. As digital data messages can be quite long, usually packets are grouped together by the sender and interpreted as a group by the receiver. In this way, the packet based network can still treat the packets individually, as it is used to doing, but the sender and receiver treat them as a group.

Protocols have been developed for such packet-based communications, such protocols being sets of rules by which the sender and receiver agree to abide by so that the packet data can be reliably understood once received at the receiver. One such protocol is known as UDP/IP (User Datagram Protocol/Internet Protocol). In this protocol, each time a sender sends a data packet the receiver sends an acknowledgement confirming to the sender that the receiver has received the data packet. Once the sender receives this acknowledgement, it can safely assume that the receiver has received the packet and the sender can thus delete this packet from its system. If the sender does not receive this acknowledgement, it assumes that the receiver has not received the packet and thus the sender sends the packet again to the receiver.

These protocols have been advantageously applied in the context of a client/server computing network, where a client computer system requests a server computer system to perform part of the client computer system's work. The client sends a request to the server asking the server to do some work. The server does the work and then sends a reply to the client. The client then uses this reply in its own local work.

In such client/server systems, there are many acknowledgements flowing back and forth between client and server as sometimes the client is the sender (when it sends a request for work) and sometimes the server is the sender (when it sends a reply back to the client). Acknowledgements are often sent after each data packet is received by the current receiver. Each of these received acknowledgements must be processed by the sender, which can present a drain on the processing resources of the sender computing system. Further, when certain communications networks are used, such as mobile networks, transmission time can be very expensive, so it is highly advantageous to flow as few packets as possible over the network. Thus, the many acknowledgements required in such systems has proven to be very expensive.

SUMMARY OF THE INVENTION

According to a first aspect, the invention provides a server computing system used in a client/server network, said computing system using a packet-based data transmission protocol in communicating data over said network, wherein, according to said protocol: a client computing system sends a request consisting of a plurality of packets to a server computing system; the server computing system processes the request and generates a reply, said reply consisting of a plurality of packets; and the server computing system sends the reply back to the client computing system; wherein said server computing system is characterized in that said server computing system comprises a means for setting a bit in a packet of said reply, said bit indicating that the client computing system need not send an acknowledgement back to the server computing system acknowledging that the client computing system has received said packet of said reply.

Preferably, the server computing system has a means for storing said packet of said reply containing said bit, and a means for retrieving said packet of said reply from storage upon receiving an indication from said client computing system that said packet of said reply has not been received by said client computing system.

According to a second aspect, the invention provides a client computing system used in a client/server network, said computing system using a packet-based data transmission protocol in communicating data over said network, wherein, according to said protocol: a client computing system sends a request consisting of a plurality of packets to a server computing system; the server computing system processes the request and generates a reply, said reply consisting of a plurality of packets; and the server computing system sends the reply back to the client computing system; wherein said client computing system is characterized in that said client computing system comprises a means for determining whether a bit has been set in a packet of said reply, said bit indicating that the client computing system need not send an acknowledgement back to the server computing system acknowledging that the client computing system has received said packet of said reply.

Preferably, the client computing system has a means for providing an indication to said server computing system that said packet of said reply has not been received.

Preferably, in the computing systems of the first two aspects of the invention said protocol is the UDP/IP protocol.

According to third and fourth aspects, the invention provides computer program products stored on computer readable storage media, for running on a server computing system or a client computing system of the first two aspects of the invention.

According to a fifth aspect, the invention provides a method of communicating packet based digital data over a communications network between a sender and a receiver, said method comprising steps of: sending a request, said request comprising a plurality of packets, to a receiver; receiving an acknowledgement from said receiver for each packet of said request; receiving a reply from said receiver, said reply comprising a plurality of packets, at least one of said packets including an indication that said packet need not be acknowledged upon receipt; acknowledging only the packets of said reply that do not contain said indication.

According to a sixth aspect, the invention provides a method of communicating packet based digital data over a communications network between a sender and a receiver, said method comprising steps of: receiving a request, said request comprising a plurality of packets, from the sender; sending an acknowledgement for each packet of said request; and sending a reply to said sender, said reply comprising a plurality of packets, at least one of said packets including an indication that said packet need not be acknowledged upon receipt.

Accordingly, the number of acknowledgement flows is greatly reduced as there is no need for the client to send an acknowledgement upon receipt of certain response packets from the server. This is especially advantageous when the packet based network is a mobile network, where the cost of transmitting a packet can be quite high.

Further, the server is saved from having to process these extra acknowledgements, and thus the processing resources of the server are conserved.

Still further, since the server stores the certain response packets in its internal memory, there is no need for the server to redo the work it has already done to generate the response if the client indicates that it has not received the response packets. The server need only retrieve these response packets from its internal memory.

BRIEF DESCRIPTION OF THE DRAWINGS

A preferred embodiment of the present invention will now be explained in detail with reference to the following figure, through which the invention can be better understood.

DETAILED DESCRIPTION OF THE PREFERRED EMBODIMENTS

Figure 1:
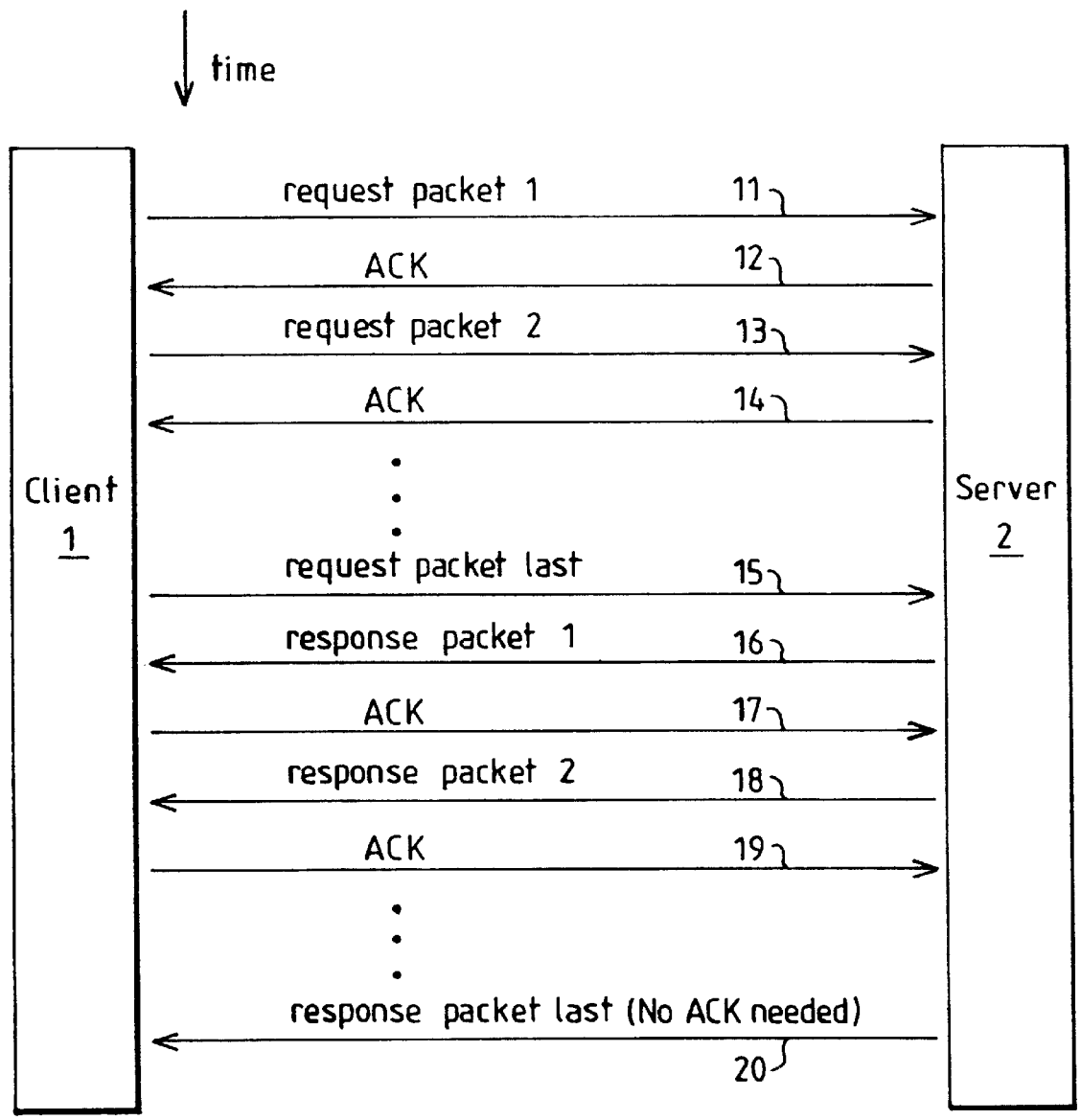
FIG. 1 is a timing diagram showing the timing of packet flows between a client and a server computer system according to a preferred embodiment of the present invention.

In FIG. 1, a client computer system 1 is requesting a server computer system 2 to perform part of the client computer system 1's work. The client 1 sends a request to the server computer system 2 in order to make known to the server 2 the nature of the work that it wants done.

Using the UDP/IP protocol, the client request is broken up into a plurality of packets, with only the first two packets 11 and 13 and the last packet 15 being illustrated in FIG. 1 for clarity. The various stages of packet flow between client 1 and server 2 will now be described with reference to FIG. 1. Where a "line" is mentioned below, these are the timing lines in the timing chart of FIG. 1. The physical "line" over which the packets are sent is most likely a single line with packets being placed over the line one at a time.

First, the client 1 sends the first request packet "request packet 1" to the server 2 (line 11). Then, the server 2 sends an acknowledgement (hereafter referred to as an "ACK") (line 12) to inform the client 1 that the server 2 has received the first request packet.

The client then sends the second request packet "request packet 2" to the server 2 (line 13). Then, the server 2 sends an ACK (line 14) to inform the client 1 that the server 2 has received the second request packet.

This above pattern then carries on until the client sends the last packet of its request "request packet last" to the server 2 (line 15). When the server 2 receives this packet, it now knows the entirety of the client's request, so it goes ahead and performs the requested processing operation and gets a result which it prepares to send as a reply back to the client 1. There is no need for the server 2 to send a separate ACK to acknowledge the receipt of the last request packet since the server 2 can combine this ACK with the first packet of its response (sent on line 16).

According to the protocol based on UDP/IP, the server 2 breaks this reply (also known as response) into packets and sends the first packet as "response packet 1" to the client 1 (line 16). Client 1 then sends an ACK on line 17 to inform server 2 that client 1 has received the "response packet 1" from the server 2.

Server 2 then sends the second part of its response as "response packet 2" on line 18. Client 1 then sends an ACK on line 19 to inform server 2 that client 1 has received the "response packet 2" from the server 2.

The above pattern carries on until the server 2 sends the last packet of the response "response packet last" on line 20. When the server 2 sends this "response packet last", server 2 sets a bit in this packet to a predefined value (e.g., the binary value "1") to inform the client 1 that a separate ACK is not needed in response to this last packet of the response. In prior implementations, the client 1 would send an ACK after receiving the "response packet last" on line 20 to inform server 2 that client 1 has received "response packet last". The server 2 also stores a copy of the contents of the "response packet last" in the server 2's internal memory. This may be, for example, a storage into a log.

The client 1 knows that it is supposed to receive the "response packet last" from the server 2 because client 1 has already received the previous packets of the response and is waiting for the last packet to arrive so that it can make sense out of the entire packet as a group. Thus, if the client 1 does not receive the "response packet last" it sends an error indicator back to the server 2 to inform server 2 that the "response packet last" has not been received. This error indicator is preferably a resend of the original request. Upon receiving this error indicator from the client 1, the server 2 need only go to its internal memory and retrieve the "response packet last" that it has stored there as described above, and then send it out to the client 1. Instead of a simple read out from memory, this may also involve reconstructing the "response packet last" from information stored in a log. This latter alternative may be time consuming but it is assumed that such reconstruction will rarely occur as usually there will be no transmission errors.

In this way, the number of ACK flows is greatly reduced as there is no need for the client 1 to send an ACK upon receipt of the "response packet last" from server 2. Most of the time, there will be no transmission errors, and thus the number of packet flows can be significantly reduced. This is especially advantageous when the packet based network is a mobile network, where the cost of transmitting a packet can be quite high.

Further, the server 2 is saved from having to process this extra ACK, and thus the processing resources of the server 2 is conserved.

Still further, since the server 2 stores the "response packet last" in its internal memory, there is no need for the server 2 to redo the work it has already done to generate the response if the client 1 indicates that it has not received the "response packet last". The server 2 need only retrieve this "response packet last" from its internal memory.

It should be noted that it need not be the last packet of the reply that contains the indication bit that no acknowledgement is needed. It could be another packet of the reply or it could be more than one packet of the reply. The client would then not send an acknowledgement when it receives those packets of the reply, and would request a resend of the packets if there was a transmission error with respect to those packets after the client has received all of the packets making up the reply.

The invention thus takes advantage of the fact that the client treats the reply as a group of packets and cannot make sense of the reply until it has received the entire group. If it does not receive the entire group, it need simply ask the server for the packets which it does not have.

I claim:

1. A server computing system used in a client/server network, said computing system using a packet-based data transmission protocol in communicating data over said network, wherein, according to said protocol:

a client computing system sends a request consisting of a plurality of packets to a server computing system;

the server computing system processes the request and generates a reply, said reply consisting of a plurality of packets;

the server computing system sends the reply back to the client computing system; and the client computing system separately acknowledges each packet of said reply by sending a separate acknowledgement packet back to the server computing system for each received packet of said reply;

wherein said server computing system is characterized in that said server computing system comprises a means for setting a bit in a packet of said reply, said bit indicating that the client computing system need not send an acknowledgement back to the server computing system acknowledging that the client computing system has received said packet of said reply.

2. The server computing system of claim 1, further comprising means for storing said packet of said reply containing said bit.

3. The server computing system of claim 2, further comprising means for retrieving said packet of said reply from storage upon receiving an indication from said client computing system that said packet of said reply has not been received by said client computing system.

4. A client computing system used in a client/server network, said computing system using a packet-based data transmission protocol in communicating data over said network, wherein, according to said protocol:

a client computing system sends a request consisting of a plurality of packets to a server computing system;

the server computing system processes the request and generates a reply, said reply consisting of a plurality of packets;

the server computing system sends the reply back to the client computing system; and the client computing system separately acknowledges each packet of said reply by sending a separate acknowledgement packet back to the server computing system for each received packet of said reply;

wherein said client computing system is characterized in that said client computing system comprises a means for determining whether a bit has been set in a packet of said reply, said bit indicating that the client computing system need not send an acknowledgement back to the server computing system acknowledging that the client computing system has received said packet of said reply.

5. The client computing system of claim 4 further comprising means for providing an indication to said server computing system that said packet of said reply has not been received.

6. The client computing system of claim 4 wherein said protocol is the UDP/IP protocol.

7. The client computing system of claim 4 wherein said network is a mobile network.

8. A computer program product stored on a computer readable storage medium, for running on a server computing system used in a client/server network, said computing system using a packet-based data transmission protocol in communicating data over said network, wherein, according to said protocol:

a client computing system sends a request consisting of a plurality of packets to a server computing system;

the server computing system processes the request and generates a reply, said reply consisting of a plurality of packets;

the server computing system sends the reply back to the client computing system; and the client computing system separately acknowledges each packet of said reply by sending a separate acknowledgement packet back to the server computing system for each received packet of said reply;

wherein said server computing system running said computer program product is characterized in that said server computing system comprises a means for setting a bit in a packet of said reply, said bit indicating that the client computing system need not send an acknowledgement back to the server computing system acknowledging that the client computing system has received said packet of said reply.

9. A computer program product stored on a computer readable storage medium, for running on a client computing system used in a client/server network, said computing system using a packet-based data transmission protocol in communicating data over said network, wherein, according to said protocol:

a client computing system sends a request consisting of a plurality of packets to a server computing system;

the server computing system processes the request and generates a reply, said reply consisting of a plurality of packets;

the server computing system sends the reply back to the client computing system; and the client computing system separately acknowledges each packet of said reply by sending a separate acknowledgement packet back to the server computing system for each received packet of said reply;

wherein said client computing system running said computer program product is characterized in that said client computing system comprises a means for determining whether a bit has been set in a packet of said reply, said bit indicating that the client computing system need not send an acknowledgement back to the server computing system acknowledging that the client computing system has received said packet of said reply.

10. A method of communicating packet based digital data over a communications network between a sender and a receiver, said method comprising steps of:

sending a request, said request comprising a plurality of packets, to a receiver;

receiving an acknowledgement from said receiver for each packet of said request;

receiving a reply from said receiver, said reply comprising a plurality of packets, at least one of said packets including an indication that said packet need not be acknowledged upon receipt;

acknowledging only the packets of said reply that do not contain said indication.

11. A method of communicating packet based digital data over a communications network between a sender and a receiver, said method comprising steps of:

receiving a request, said request comprising a plurality of packets, from the sender;

sending an acknowledgement for each packet of said request; and sending a reply to the sender, said reply comprising a plurality of packets, at least one of said packets including an indication that said packet need not be acknowledged upon receipt.

* * * * *